(12) United States Patent
Vaidya et al.

(10) Patent No.: US 11,587,101 B2
(45) Date of Patent: Feb. 21, 2023

(54) PLATFORM FOR DETECTING ABNORMAL ENTITIES AND ACTIVITIES USING MACHINE LEARNING ALGORITHMS

(71) Applicant: DeepRisk.ai, LLC, Irving, TX (US)

(72) Inventors: Chaitanya Nandkishore Vaidya, The Colony, TX (US); Mathew Robert Black, Farmers Branch, TX (US); Alvin Babu John, Mesquite, TX (US)

(73) Assignee: DeepRisk.ai, LLC, Irving, TX (US)

( * ) Notice: Subject to any disclaimer, the term of this patent is extended or adjusted under 35 U.S.C. 154(b) by 429 days.

(21) Appl. No.: 16/424,319

(22) Filed: May 28, 2019

(65) Prior Publication Data
US 2020/0380531 A1 Dec. 3, 2020

(51) Int. Cl.
*G06Q 30/00* (2012.01)
*G06N 20/00* (2019.01)
*G06Q 40/02* (2012.01)
*G06Q 40/08* (2012.01)
*G06Q 30/018* (2023.01)

(52) U.S. Cl.
CPC ......... *G06Q 30/0185* (2013.01); *G06N 20/00* (2019.01); *G06Q 40/025* (2013.01); *G06Q 40/08* (2013.01)

(58) Field of Classification Search
CPC .. G06Q 30/0185; G06Q 40/025; G06Q 40/08; G06N 20/00; G06N 3/088; G06N 3/0472; G06N 3/0454; G06N 3/0445
See application file for complete search history.

(56) References Cited

U.S. PATENT DOCUMENTS

| | | | |
|---|---|---|---|
| 7,418,431 B1 * | 8/2008 | Nies | G06F 16/972 |
| | | | 707/E17.117 |
| 10,628,834 B1 * | 4/2020 | Agarwal | G06Q 30/0185 |
| 10,986,106 B2 * | 4/2021 | Muddu | G06F 16/24578 |
| 11,361,381 B1 * | 6/2022 | Lehmuth | G06F 16/212 |

(Continued)

OTHER PUBLICATIONS

Ellison, "Fraud Detection Using Autoencoders in Keras with a TensorFlow Backend," Oracle AI & Data Science Blog, Aug. 9, 2018, available online at https://blogs.oracle.com/ai-and-datascience/post/fraud-detection-using-autoencoders-in-keras-with-a-tensorflow-backend (Year: 2018).*

*Primary Examiner* — Jan P Mincarelli
(74) *Attorney, Agent, or Firm* — Morrison & Foerster LLP

(57) ABSTRACT

The present disclosure generally relates to providing accurate and real-time insights into abnormal entities and activities using machine learning algorithms. An exemplary computer-enabled method comprises receiving a set of input data, wherein the set of input data is associated with an entity; automatically obtaining, based on the received set of input data, a set of derived data, wherein the set of derived data is associated with the entity; obtaining, based on the set of derived data, a plurality of feature values corresponding to a plurality of features; providing the plurality of feature values to an autoencoder-decoder to obtain a plurality of feature-specific reconstruction errors; selecting, based on the plurality of feature-specific reconstruction errors, one or more features from the plurality of features; outputting the selected one or more features and one or more textual descriptions associated with the selected one or more features.

22 Claims, 9 Drawing Sheets
(5 of 9 Drawing Sheet(s) Filed in Color)

(56) References Cited

U.S. PATENT DOCUMENTS

| | | | |
|---|---|---|---|
| 2011/0225076 A1* | 9/2011 | Wang | G06Q 40/02 |
| | | | 705/35 |
| 2019/0073647 A1* | 3/2019 | Zoldi | G06Q 20/4016 |
| 2019/0333175 A1* | 10/2019 | Rose | G06N 3/0445 |
| 2019/0378051 A1* | 12/2019 | Widmann | G06N 20/00 |
| 2020/0184017 A1* | 6/2020 | Batra | G06F 40/295 |
| 2020/0334680 A1* | 10/2020 | Vanga | G06N 20/00 |

* cited by examiner

600

602
receiving a set of input data, wherein the set of input data is associated with an entity

604
automatically obtaining, based on the received set of input data, a set of derived data, wherein the set of derived data is associated with the entity

606
obtaining, based on the set of derived data, a plurality of feature values corresponding to a plurality of features

608
providing the plurality of feature values to an autoencoder-decoder to obtain a plurality of feature-specific reconstruction errors

610
selecting, based on the plurality of feature-specific reconstruction errors, one or more features from the plurality of features

602
outputting the selected one or more features and one or more natural-language descriptions associated with the selected one or more features

FIG. 6

PLATFORM FOR DETECTING ABNORMAL ENTITIES AND ACTIVITIES USING MACHINE LEARNING ALGORITHMS

FIELD OF INVENTION

The present disclosure relates generally to machine learning algorithms, and more specifically to providing accurate and real-time insights into abnormal entities and activities using machine learning algorithms.

BACKGROUND

Current technologies for detecting abnormal entities (e.g., merchants) and activities (e.g., transactions) in the merchant processing industry are generally inefficient, inaccurate, and costly. For example, some institutions maintain a large number of staff to monitor and analyze various transactions to uncover abnormal activities or patterns of activity. This can be prohibitively expensive, as the analysis requires decades of experience and constant vigilance.

Some institutions adopt computer programs designed to detect abnormal entities and transactions using rule-sets. For example, some underwriting and risk management platforms and services in the ISO/MSP-Bank industry operate on custom, rule-based queues and flagging systems. However, because fraudulent activities are constantly evolving and taking on new forms, rule-sets implemented by computer software need to be constantly updated and thus can quickly become cumbersome and overly complex.

Further, both the manual approach and the rule-based approach are error-prone, as both approaches can produce high false-positive rates and low-accuracy due to bias. Due to the lack of accuracy and efficiency in existing approaches, as well as the highly regulated and slow moving nature of the merchant processing industry in terms of new technology adoption, little innovation has been done in this field. Since it is common for companies in this space to have millions of transactions without having a large staff or proper tools to monitor and evaluate their risk, many companies are forced to simply be reactive instead of proactive.

Accordingly, there is a need for an accurate, efficient, and cost-effective platform for detecting abnormal entities and activities that goes beyond preprogrammed rule-sets and is not susceptible to biases. Further, there is a need for such a platform to provide actionable insights and recommendations for any detected abnormality, rather than simply indicating that abnormality has been detected.

BRIEF SUMMARY

An exemplary computer-enabled method for detecting an abnormal entity comprises: receiving a set of input data, wherein the set of input data is associated with an entity; automatically obtaining, based on the received set of input data, a set of derived data, wherein the set of derived data is associated with the entity; obtaining, based on the set of derived data, a plurality of feature values corresponding to a plurality of features; providing the plurality of feature values to an autoencoder-decoder to obtain a plurality of feature-specific reconstruction errors; selecting, based on the plurality of feature-specific reconstruction errors, one or more features from the plurality of features; outputting the selected one or more features and one or more textual descriptions associated with the selected one or more features.

In some embodiments, the entity is a merchant.

In some embodiments, the method comprises providing a recommended action on the merchant based on the plurality of feature-specific reconstruction errors.

In some embodiments, the recommended action comprises closing an account associated with the entity.

In some embodiments, the set of input data comprises data related to a merchant application.

In some embodiments, the set of derived data is obtained from a plurality of data sources.

In some embodiments, the method comprises before providing the plurality of feature values to the autoencoder-decoder, performing a check on the set of derived data based on a plurality of rule-sets.

In some embodiments, the plurality of features comprises: how long the entity has been in business, a number of businesses the entity has, a transaction size of the entity, a transaction volume of the entity, location of the entity, a credit score, transaction types, a formation type, credit histories, or any combination thereof.

In some embodiments, a feature of the plurality of features is weighted based on percentages of ownership.

In some embodiments, the plurality of features comprises: a transaction amount, a refund amount, a type of card, entry mode, authorization source, cardholder authorization method, a terminal type, a purpose of a transaction, usage history of a card, time of a transaction, a number of attempts associated with a transaction, information related to a cardholder, information related to a card, or any combination thereof.

In some embodiments, the autoencoder-decoder comprises: a first recurrent neural network configured to compress the plurality of feature values to obtain a set of compressed values; and a second recurrent neural network configured to decompress the set of compressed values to obtain a plurality of reconstructed feature values.

In some embodiments, the plurality of feature-specific reconstruction errors comprises a plurality of differences between the plurality of reconstructed feature values and the plurality of feature values.

In some embodiments, the method further comprises: scaling the plurality of differences based on variances associated with the plurality of features.

In some embodiments, the method further comprises calculating a total reconstruction error of the entity based on the plurality of feature-specific reconstruction errors.

In some embodiments, the autoencoder-decoder is trained using an initial set of training data, wherein the initial set of training data comprises more data related to normal entities than data related to abnormal entities.

The some embodiments, normal entities are non-fraudulent merchants, and abnormal entities are fraudulent merchants.

In some embodiments, the method further comprises retraining the autoencoder-decoder based on the set of derived data.

In some embodiments, the entity is a first entity, the method further comprises: outputting one or more features associated with a second entity and one or more descriptions associated with the one or more features associated with the second entity.

An exemplary electronic device comprises: one or more processors; a memory; and one or more programs, wherein the one or more programs are stored in the memory and configured to be executed by the one or more processors, the one or more programs including instructions for: receiving a set of input data, wherein the set of input data is associated with an entity; automatically obtaining, based on the received set of input data, a set of derived data, wherein the set of derived data is associated with the entity; obtaining, based on the set of derived data, a plurality of feature values corresponding to a plurality of features; providing the plurality of feature values to an autoencoder-decoder to obtain a plurality of feature-specific reconstruction errors; selecting, based on the plurality of feature-specific reconstruction errors, one or more features from the plurality of features; outputting the selected one or more features and one or more descriptions associated with the selected one or more features.

An exemplary non-transitory computer-readable storage medium storing one or more programs, the one or more programs comprising instructions, which when executed by one or more processors of an electronic device, cause the electronic device to: receiving a set of input data, wherein the set of input data is associated with an entity; automatically obtaining, based on the received set of input data, a set of derived data, wherein the set of derived data is associated with the entity; obtaining, based on the set of derived data, a plurality of feature values corresponding to a plurality of features; providing the plurality of feature values to an autoencoder-decoder to obtain a plurality of feature-specific reconstruction errors; selecting, based on the plurality of feature-specific reconstruction errors, one or more features from the plurality of features; outputting the selected one or more features and one or more descriptions associated with the selected one or more features.

DESCRIPTION OF THE FIGURES

The patent or application file contains at least one drawing executed in color. Copies of this patent or patent application publication with color drawing(s) will be provided by the Office upon request and payment of the necessary fee.

FIG. 6 depicts process for detecting an abnormal entity, in accordance with some embodiments.

DETAILED DESCRIPTION

Figure 1:
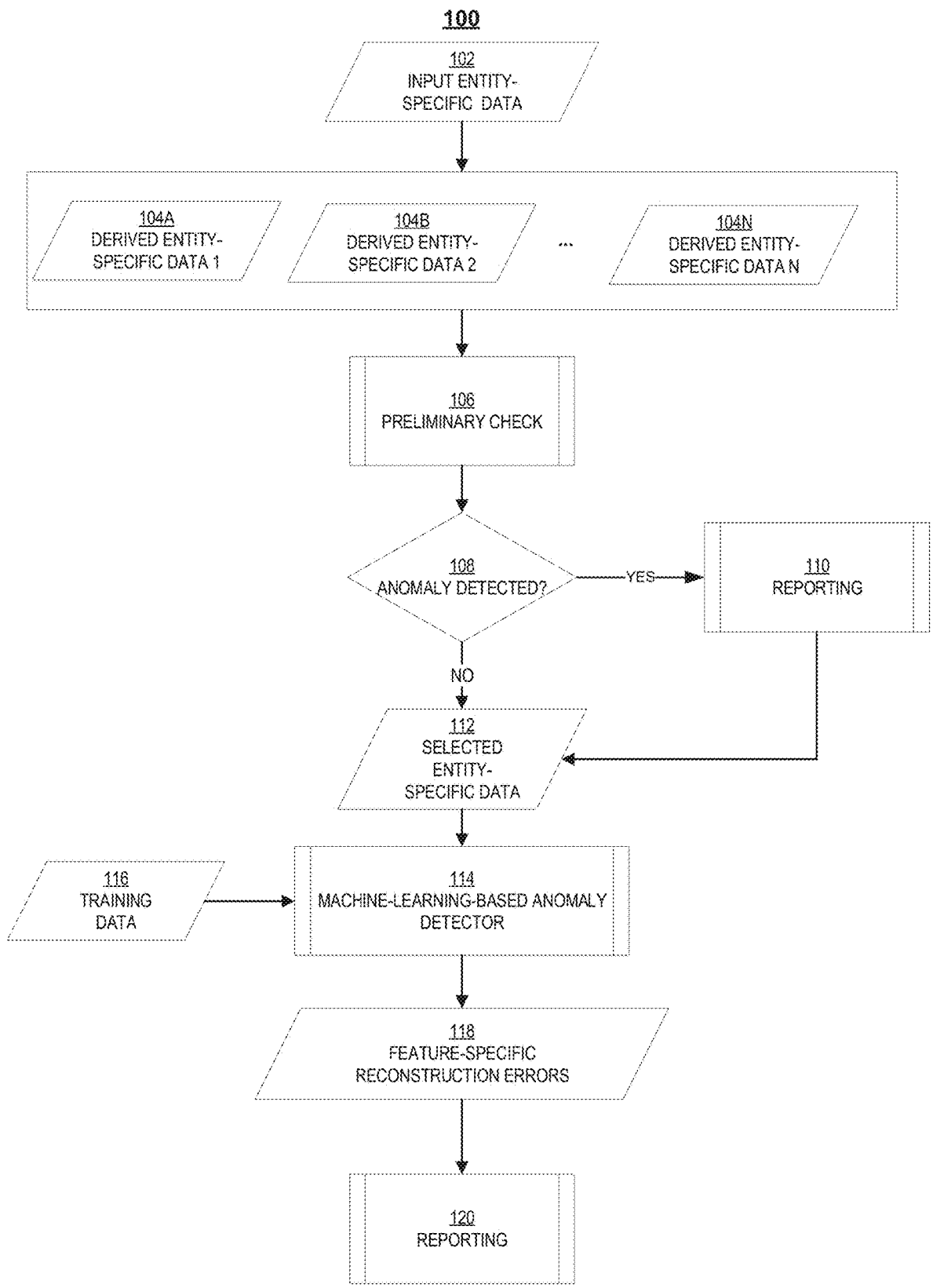
FIG. 1 depicts an exemplary process for providing an abnormality detection platform, in accordance with some embodiments of the invention.

Disclosed herein are methods, electronic devices, user interfaces, systems, and non-transitory computer-readable storage media for providing an accurate, efficient, and cost-effective platform for detecting abnormal entities and activities that goes beyond preprogrammed rule-sets and is not susceptible to biases. In some embodiments, the detection platform provides actionable insights and recommendations for any detected abnormality, rather than simply indicating that abnormality has been detected.

The platform comprises a machine-learning-based anomaly detector such as a trained deep neural network. The platform goes beyond rule sets and biases to get powerful and high precision risk-detection, reducing false positive rates substantially while still being able to detect a large majority of fraudulence. Further, the platform produces describable, concise, and actionable results, as being able to achieve high precision may not be good enough for many companies in this space if a system cannot explain where it gets the results from.

Currently, there are no prevalent single portal solutions for a user to see all merchant and transaction information to aid decision-making in this industry. This platform provides a single point of entry to both address the underwriting and live transaction risk to help in both efficient on-boarding and easier decision-making.

The invention can be used in any industry that involves risk-based decision-making to uncover abnormal entities and abnormal activities and provide insightful and actionable results. For example, loans servicing is separate from merchant services for banks but still present similar risks on both underwriting and loan repayment. Extending past banks could involve the insurance industry. Insurance is based on measuring potential risk, and would be highly compatible to this model and platform. Generally, any industry that has inherent risk-based decision-making, an evaluation (e.g., underwriting) process and a continuous flow of information (e.g., transactions, payments) post-decision to be a good fit to this platform.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Although the following description uses terms "first," "second," etc. to describe various elements, these elements should not be limited by the terms. These terms are only used to distinguish one element from another. For example, a first graphical representation could be termed a second graphical representation, and, similarly, a second graphical representation could be termed a first graphical representation, without departing from the scope of the various described embodiments. The first graphical representation and the second graphical representation are both graphical representations, but they are not the same graphical representation.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1 illustrates an exemplary process 100 for providing an abnormality detection platform, in accordance with some embodiments of the invention. Process 100 is performed, for example, using one or more electronic devices implementing a software platform. In some examples, process 100 is performed using a client-server system, and the blocks of process 100 are divided up in any manner between the server and a client device. In some examples, the blocks of process 100 are divided up between the server and multiple client devices. In other examples, process 100 is performed using only a client device (e.g., user device 600) or only multiple client devices. In process 100, some blocks are, optionally, combined, the order of some blocks is, optionally, changed, and some blocks are, optionally, omitted. In some examples, additional steps may be performed in combination with the process 100. Accordingly, the operations as illustrated (and described in greater detail below) are exemplary by nature and, as such, should not be viewed as limiting.

With reference to FIG. 1, the platform receives input data relating to an entity 102. The entity can be a merchant (e.g., an e-commerce company, a physical store). In some embodiments, the platform provides one or more user interfaces (e.g., via a web portal) that allow a representative of the entity to enter the entity-specific data 102 as a part of completing a merchant application form. In some embodiments, the entity-specific data 102 comprises basic information about the entity, such as: business name, business location(s), business license(s), type of transaction supported, ownership structure, information about the owners, information about the employees, tax identification number, social security number, transaction volume (e.g., monthly), or any combination thereof.

In some embodiments, after receiving the input data relating to an entity, the platform automatically initiates checks for abnormalities and updates its reporting user interfaces accordingly. Thus, the platform condenses the entire workflow into a single point of data entry, thus relieving the representative of the entity from having to provide duplicative inputs across multiple user interfaces (e.g., at different websites having different required fields, stipulations, and processes, at different times) or having to provide a large amount of information related to the entity.

After the platform receives the input entity-specific data 102, the platform automatically pulls a variety of derived entity-specific data 104A-N from one or more data sources. The derived entity data 104A-N can comprise any data specific to the entity or the owners of the entity, such as: credit reports of the entity, identity reports of the entity, tax identity verification, bank verification, location verification, social media presences (e.g., business information from Yelp), court filings and documents, or any combination thereof. In some embodiments, the platform automatically conforms the derived entity data obtained from various data sources to predefined data formats and automatically merges, de-duplicates, and aggregates the entity-specific data 104A-N.

At block 106, the platform automatically performs a preliminary check based on the derived entity-specific data 104A-N. In some embodiments, the preliminary check comprises a plurality of rule-sets for identifying abnormal entities and abnormal activities. For example, the preliminary check can include a determination of whether the credit scores associated with the entity or the owners are below a predefined threshold. As another example, the preliminary check can include a determination of whether the entity is associated a predefined event (e.g., bankruptcy) or a predefined status (e.g., being listed in the MATCH Terminated Merchant list). As another example, the preliminary check can detect inconsistencies among the derived entity-specific data 104A-N that are indicative of fraudulent activities. As another example, the preliminary check can include address validation by pulling a street view of the business address from a map database (e.g., Google Map) and analyzing the alleged store front (e.g., using computer vision techniques).

At block 108, the platform determines whether any anomaly has been detected from the preliminary check 106. If anomaly has been detected, the process 100 proceeds to block 110 to report the detected anomaly. The reporting can comprise automatically generating a standardized report indicative of the detected anomaly, and/or automatically transmitting the report to a user group. In other words, the preliminary check at block 106 serves as a front-line risk mitigation step before proceeding to the machine-learning-based detector of the platform. It is crucial to filtering out the "bad actors" that are neither cunning nor discrete in their methods. For example, a legitimate OFAC match or a stolen identity may halt the application process, optionally followed by informing the proper authorities by generating and sending reports.

With reference to FIG. 1, after the preliminary check 106 is complete, the process 100 proceeds to input selected entity data 112 into a machine-learning-based anomaly detector 114. In some embodiments, the selected entity-specific data 112 is a subset of the derived entity-specific data 104A-N and the input entity-specific data 102. In some embodiments, the selected entity-specific data 112 are the same types of data as the training data 116.

In some embodiments, the selected entity-specific data 112 comprises data related to an entity (e.g., merchant data). The merchant data generally is obtained based on a merchant application (e.g., an application for a merchant account). The merchant data includes information related to the owner of the business and information related to what the business is and how it performs. In some embodiments, the merchant data includes: how long the merchant has been in business (e.g., number of years), the number of businesses the merchant has (e.g., number of businesses in a franchise), transaction size (e.g., average ticket), transaction volume (e.g., expected, average), owner's demographic information (e.g., age), location of the business, relationships between the owner and the business (e.g., physical distance), percentage of ownership division, percentage of transaction types (card, manual, keyed, mail, and the Internet), Merchant Category Code (MCC), formation type of the business (e.g., LLC), credit scores of the owners, credit histories of the owners (e.g., number of credit lines over a certain time period, credit inquiries made on the owner over a certain time period), type of business (e.g., coffee shop, construction company), or any combination thereof.

In some embodiments, the platform can weight any of the features above. For example, a feature related to the owners of the business can be weighted based on the percentage of ownership of the company. As another example, more recent data (e.g., more recent credit inquiries) can be weighted heavier than less recent data.

In some embodiments, the platform can adjust the granularity of any of the features above. For example, the location of the business can be information related to the zip code of the business. Adjusting the granularity allows the platform to generalize merchants sharing similar characteristics while still allowing the model to differentiate among merchants.

In some embodiments, the selected entity-specific data 112 comprises data related to an activity (e.g., transaction data). Transactional data provides information related to activities of an entity (e.g., a merchant) and can be indicative of how the business is performing. In some embodiments, the transaction data includes transaction amount (e.g., for a sale), a refund amount, type of card (e.g., VISA, MasterCard), entry mode (e.g., card, e-commerce), authorization source (i.e., the way in which the transaction was authorized), cardholder authorization method (e.g., PIN, signature), type of the associated terminal, capacity of the associated terminal, purpose of the transaction (e.g., debit, credit, cash advance), the number of times the card has been seen at the same business, the percentage of transactions that are from the same set of cards at the same business, the time difference between two transactions, the number of attempts associated with the transaction, information related to the cardholder, information related to the card (e.g., bank), or any combination thereof.

In some embodiments, the platform can transform any of the transaction data to a sin/cosine pair format. This is a transformation of the date of the transaction into a sin/cosine pair where each day represents a point on the curve and the y axis is a transaction-related value. This provides a unique value for every day in the year while being bound between −1 to 1 and more importantly having the end bounds of the year wrap around to the beginning of the next year. This allows the platform to have some context for the seasonality of the transaction and would allow it to inference the fact that more transactions happen during periods of the year such as the holidays. In some embodiments, the transaction data includes daily Sin/Cosine. This is a transformation of the time of the transaction into a sin/cosine pair. The concept is similar to the seasonality just more focused on the time of day the transaction appeared.

Figure 2A:
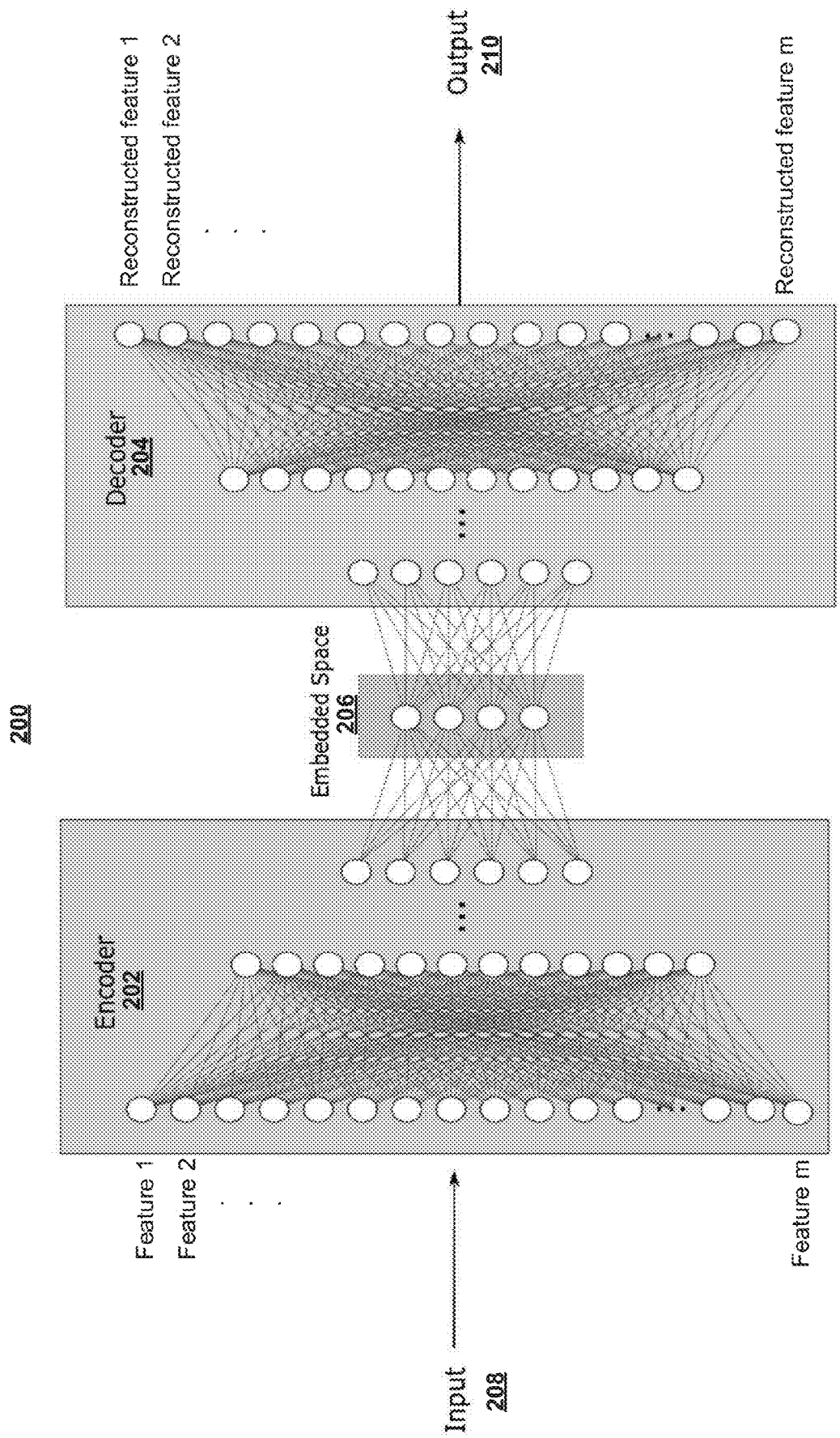
FIG. 2A depicts an exemplary machine-learning-based anomaly detector, in accordance with some embodiments of the invention.

FIG. 2A depicts an exemplary machine-learning-based anomaly detector 200, in accordance with some embodiments of the invention. In some embodiments, the machine-learning-based anomaly detector 114 is a deep neural network trained to receive data specific to a single entity (e.g., a single merchant) and detect whether the entity or the associated activities (e.g., transactions) are abnormal. In the depicted example, the anomaly detector is a recurrent neural network ("RNN") variational autoencoder-decoder.

With reference to FIG. 2A, the detector comprises two recurrent neural networks 202 and 204 attached together with a single layer as the join area, the embedded space 206. The task of the encoder 202 is to compress the input 208 to the embedded vector space 206, while the task of the decoder 204 is to decompress the embedded vector back to the dimension of the original input. Specifically, the encoder 202 reduces the dimensionality of a large input 208 by compressing the input, layer by layer, until it is some embedded space size. The decoder 204 operates to decompress the compressed input in the embedded space 206 to output a reconstructed version of the input. The detector 200 learns by minimizing the reconstruction error between the input 208 and the output 210. In some embodiments, the reconstruction error is based on the reconstruction error between each of the features in the input (i.e., features 1, 2, . . . , m) and each of the corresponding features in the output (i.e., reconstructed features 1, 2, . . . , m). In some embodiments, the reconstruction error is calculated as the mean squared error ("MSE") among the feature-specific reconstruction errors. This allows both the encoder and the decoder to learn and, if desired, later be split apart for their respective roles.

The architecture of the RNN variational autoencoder-decoder performs unsupervised learning. It is well-suited for learning anomaly detection because its training does not require labelled training data, which are difficult to obtain. Specifically, it is difficult to obtain training data that has predefined labels (e.g., training data labelled as being related to a fraudulent merchant or a fraudulent activity). Further, the ones that do exist are not granular enough to determine whether an individual transaction was fraudulent or the merchant themselves were fraudulent.

Instead, the autoencoder-decoder is trained using a dataset (e.g., training data 116 in FIG. 1) that is unlabeled, but is easier to obtain and is dominated by data related to normal entities and activities (i.e., "normal" data). The dataset is biased toward normal data. In some embodiments, the dataset is biased toward normal data because the dataset is obtained from data sources that are known to provide data related to a group of entities where the normal entities (e.g., non-fraudulent merchants) outnumbers the abnormal entities (e.g., fraudulent merchants). In some embodiments, the dataset is biased toward normal data because the platform removes data known to be related to abnormal entities (e.g., fraudulent merchants) from the training dataset. Feeding the training dataset into the autoencoder-decoder 200 forces it to learn how to compress normal data. Although "abnormal" data (i.e., data related to fraudulent entities or fraudulent activities) may be in the training dataset, the learning done based on the abnormal data is inconsequential.

Having learned how to compress normal data, the autoencoder-decoder cannot compress or decompress abnormal data to the same extent and as such, the reconstruction error is much higher than that of normal data. By training the autoencoder-decoder to be better at reconstructing normal data than reconstructing abnormal data, the platform does not need to be reconfigured or reprogrammed when a new fraud technique comes to light. Rather, the autoencoder-decoder simply detects the data related to the new fraud technique is different from the normal data, in that it yields a higher reconstruction error, and flags the data accordingly.

Because 206 is essentially a dimensionality reduction from the input 208, clustering methods can be used on 206 (e.g., K Nearest Neighbors) can be used much more effectively. In some embodiments, clustering methods can be used to cluster the results in the embedded space 206. This enables a similarity metric to be used to find other existing merchants similar to this merchant (e.g., distance between the embedded space of the merchant and the closest cluster representing similar merchants) and analyze what the future performance of this merchant may be.

Turning back to FIG. 1, the machine-learning-based anomaly detector has been trained based on training data 116. As discussed above, the training data 116 is a dataset that is biased toward normal data. In some embodiments, an initial set of training data 116 is a set of historical data related to a group of entities where the normal entities (e.g., non-fraudulent merchants) outnumbers the abnormal entities (e.g., fraudulent merchants). For example, the training data 116 can be a dataset gathered over many years (e.g., 12 years) on merchants and associated transactions. In some embodiments, the platform removes data known to be related to abnormal entities from the training data 116 before training the machine-learning-based anomaly detector.

In some embodiments, the machine-learning-based anomaly detector 114 is first trained using an initial set of training data, and then retrained repeatedly. For example, the anomaly detector 114 is retrained periodically (e.g., monthly, biweekly) or upon occurrence of certain events (e.g., based on user input, when the platform has accumulated a certain amount of new training data). In some embodiments, when the anomaly detector 114 is retrained, the anomaly detector is retrained using new training data not previously available to the platform. For example, the new training data can include data from the input entity-specific data 102 and the derived entity-specific data 104A-N that have since been obtained by the platform since the last training event. Further, the new training data can also include transactions associated with all of the known entities that have occurred when the last training event. In some embodiments, the initial training set and new training sets are preprocessed by the platform (e.g., merged, aggregated, de-duplicated) before inputted into the anomaly detector 114.

In other words, as new entities (e.g., merchants) provide their information to the platform (e.g., by completing merchant application forms), information related to the new entities can become part of the training data used to continuously train the machine-learning-based anomaly detector 114. Further, as the entities known to the platform generate new transactions, the new transactions are used to continuously train the machine-learning-based anomaly detector 114.

In some embodiments, the training data 116 comprises data related to an entity (e.g., merchant data. The merchant data generally is obtained based on a merchant application (e.g., an application for a merchant account). The merchant data includes information related to the owner of the business and information related to what the business is and how it performs. In some embodiments, the merchant data includes: how long the merchant has been in business (e.g., number of years), the number of businesses the merchant has (e.g., number of businesses in a franchise), transaction size (e.g., average ticket), transaction volume (e.g., expected, average), owner's demographic information (e.g., age), location of the business, relationships between the owner and the business (e.g., physical distance), percentage of ownership division, percentage of transaction types (card, manual, keyed, mail, and the Internet), Merchant Category Code (MCC), formation type of the business (e.g., LLC), credit scores of the owners, credit histories of the owners (e.g., number of credit lines over a certain time period, credit inquiries made on the owner over a certain time period), type of business (e.g., coffee shop, construction company), or any combination thereof.

In some embodiments, the platform can weight any of the features above. For example, a feature related to the owners of the business can be weighted based on the percentage of ownership of the company. As another example, more recent data (e.g., more recent credit inquiries) can be weighted heavier than less recent data.

In some embodiments, the platform can adjust the granularity of any of the features above. For example, the location of the business can be information related to the zip code of the business. Adjusting the granularity allows the platform to generalize merchants sharing similar characteristics while still allowing the model to differentiate among merchants.

In some embodiments, the training data 116 comprises data related to an activity (e.g., transaction data). Transactional data provides information related to activities of an entity (e.g., a merchant) and can be indicative of how the business is performing. In some embodiments, the transaction data includes transaction amount (e.g., for a sale), a refund amount, type of card (e.g., VISA, MasterCard), entry mode (e.g., card, e-commerce), authorization source (i.e., the way in which the transaction was authorized), cardholder authorization method (e.g., PIN, signature), type of the associated terminal, capacity of the associated terminal, purpose of the transaction (e.g., debit, credit, cash advance), the number of times the card has been seen at the same business, the percentage of transactions that are from the same set of cards at the same business, the time difference between two transactions, the number of attempts associated with the transaction, information related to the cardholder, information related to the card (e.g., bank), or any combination thereof.

In some embodiments, the platform can transform any of the transaction data to a seasonal sin/cosine format. This is a transformation of the date of the transaction into a sin/cosine pair where each day represents a point on the curve and the y axis is a transaction-related value. This provides a unique value for every day in the year while being bound between −1 to 1 and more importantly having the end bounds of the year wrap around to the beginning of the next year. This allows the platform to have some context for the seasonality of the transaction and would allow it to inference the fact that more transactions happen during periods of the year such as the holidays. In some embodiments, the transaction data includes daily Sin/Cos. This is a transformation of the time of the transaction into a sin/cos pair. The concept is similar to the seasonality just more focused on the time of day the transaction appeared.

Due to the number of transactions, highly efficient processes need be used to perform any transformations or feature extraction. Some features have dependencies based on the merchant or previous transactions so they must be computed on a per-merchant level, whereas some features (e.g., sin/cosine transformation of the merchants) do not have such dependencies. In some embodiments, for some features (e.g., sin/cosine transformation), the platform performs vectorized operations on the entire set of transactions with Multithreaded CPU acceleration or GPU acceleration. In some embodiments, for some features (e.g., those that must be calculated for an individual merchant), the platform groups the transactions by merchant and perform each group transformation in parallel. Since each operation within the group is isolated from the other groups, the platform also vectorizes the operations on the group to allow for maximum parallelism. In some embodiments, the groups are organized into a priority queue such that the merchants with the largest transactions are processed first allowing for maximum usage of all cores, as discussed below.

With GPU methods, it would be ideal to have each thread executing the same instructions at the same time. During the evaluation stage, all transactions of a merchant to must be passed through the RNN to evaluate the entire pattern of transactions. Ideally we would need to have every merchant in a set to have the same number of transactions so that there are no idle threads in the system. However, because we have a varying number of transactions for every merchant, the platform includes a queuing system that will evaluate the merchants with the most transactions first causing minimal idle threads while still allowing the vectorized operations on the GPU to take place.

In some embodiments, a batching strategy is implemented on the training data to avoid overfitting of merchants with relatively large amounts of transactions in comparison to other merchants. The batch size is a hyper-parameter that defines the number of samples to work through before updating the internal model parameters. If the detector is trained based on a training set that includes more data from merchants who have a larger number of transactions, it is not as accurate on merchants who have a smaller number of transactions. Thus, a batching strategy is implemented to force merchants with large number of transactions to be batched with merchants that have few transactions with some ratio. This means that, at the end of the batch, the learning applied (i.e., the updating of the internal model parameters) will be evenly distributed across merchants with large numbers of transactions and those with small numbers of transactions.

As discussed above, the training data 116 is biased toward normal data. Feeding the training data 116 into the autoencoder-decoder 114 forces it to learn how to compress normal data. Having learned how to compress normal data, the autoencoder-decoder cannot compress or decompress abnormal data to the same extent and as such, the reconstruction error is much higher than that of normal data. Accordingly, abnormal data (e.g., indicative of fraudulent merchant, fraudulent transaction of a fraudulent or non-fraudulent merchant) can be detected based on the magnitude of the reconstruction error.

Turning back to FIG. 1, the anomaly detector 114 receives the selected entity-specific data 112 and outputs the reconstructed input, in accordance with the operation of the autoencoder-decoder described with reference to FIG. 2. Based on the difference between the input (i.e., the selected entity-specific data 112) and the output (i.e., the reconstructed version of the selected entity-specific data 112), the detector 114 calculates a plurality of feature-specific reconstruction errors 118. In some embodiments, an overall reconstruction error is calculated as the MSE between the input and the output.

Since the reconstruction error represents the overall difference between the input and the output of the detector, a perfect reconstruction would be one that yields no difference between the input and the output (i.e., the total reconstruction error is zero). On the other hand, the larger the reconstruction error, the more anomalous the input is. By identifying the feature(s) with the largest feature-wise reconstruction error(s), the platform can determine what specific feature(s) of the input are the most anomalous from the typical dataset.

The autoencoder-decoder allows for real-time updating of risk as a merchant receives transactions. Specifically, the merchant's statement information is stored and used to provide context to the transactional information to try to learn not only whether or not an individual transaction is anomalous for this merchant, but to detect if the pattern of transactions is anomalous for this merchant. To accomplish this, each of the encoder and the decoder networks is implemented as a RNN, which provides information about the previous states of the system to future predictions. This allows the platform to see whether this transaction pattern is anomalous for this type of merchant and be able to have the NN make comparisons about other merchants of the same type.

Figure 2B:
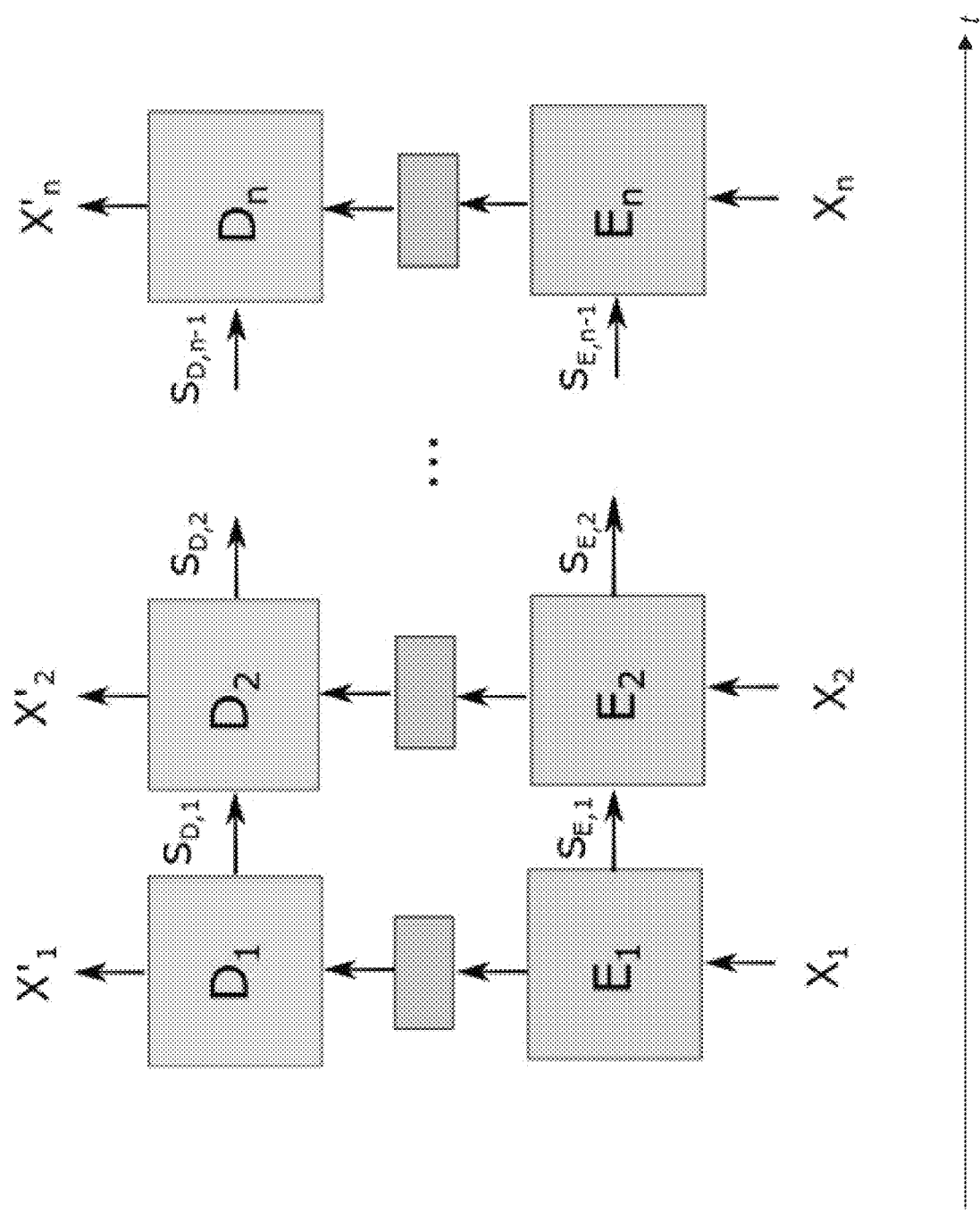
FIG. 2B depicts an exemplary machine-learning-based anomaly detector, in accordance with some embodiments of the invention.

With reference to FIG. 2B, E represents a subnetwork of the encoder network, and D represents a subnetwork of the decoder network. $X_1$, $X_2$, $X_n$ represent data related to different transactions of the merchant, which are sequentially inputted into E. $X_1$ is compressed by E and decompressed by D to produce a reconstructed version of $X_1$. $X'_1$. As shown, the previous state information of E is preserved and used by E for future predictions. Similarly, the previous state information of a subnetwork D of the decoder network is preserved and used by D to make future predictions.

At block 120, the platform provides reporting based on the reconstruction errors. In some embodiments, the reporting comprises providing features and the reconstruction errors associated with the features, for example, using one or more user interfaces. In some embodiments, the platform determines whether a feature-specific reconstruction error exceeds a threshold. In accordance with a determination that the feature-specific reconstruction error exceeds the threshold, the platform reports the reconstruction error and the associated feature. In some embodiments, the platform determines whether a total reconstruction error exceeds a threshold. In accordance with a determination that the total reconstruction error exceeds the threshold, the platform reports the entity as an abnormal entity. The threshold can be a system default value or a user-specified value. In some embodiments, the platform automatically provides one or more notifications alerting the user of the anomalies detected. In some embodiments, the platform automatically transmits an alert to the authorities.

Figure 3:
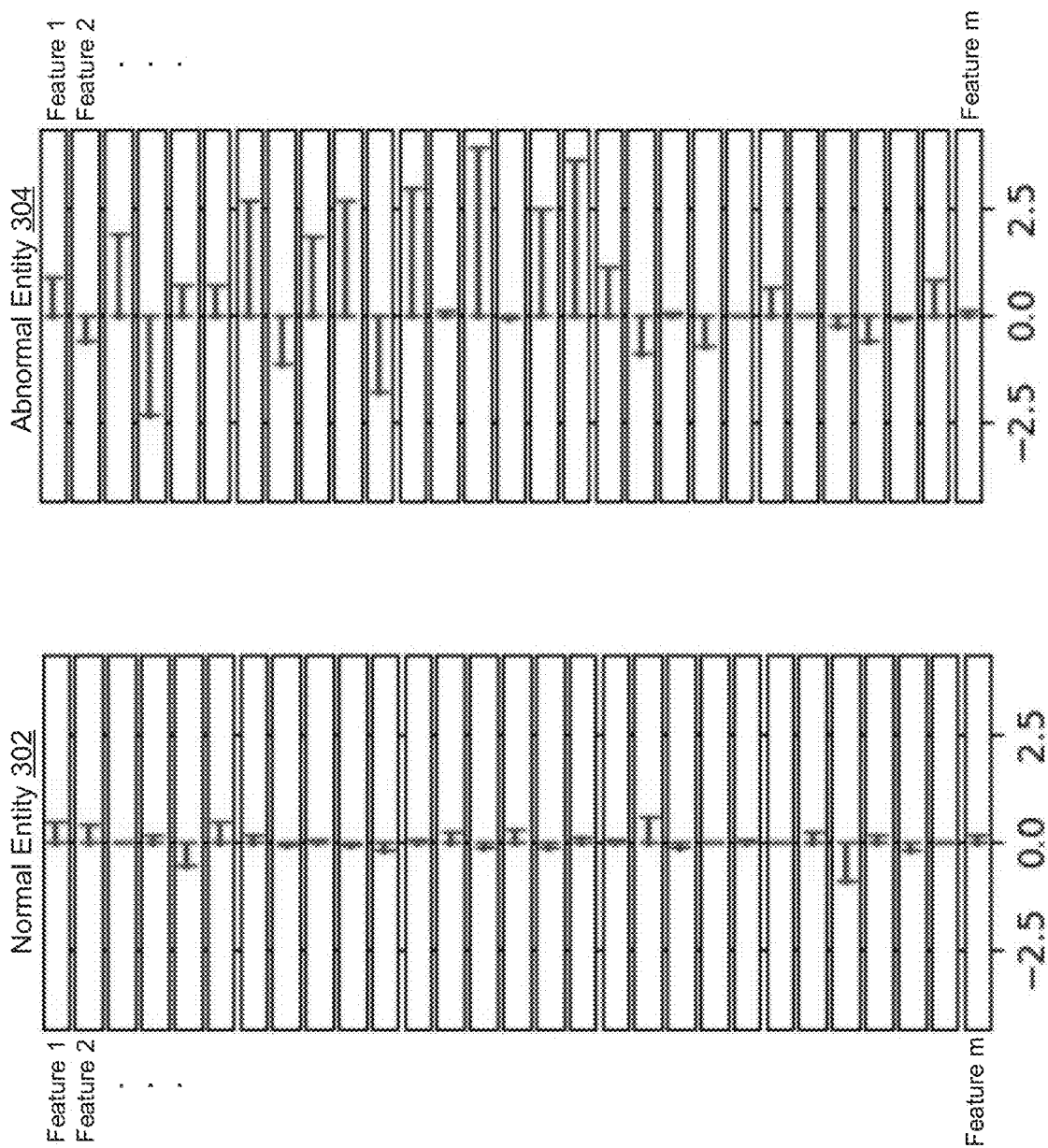
FIG. 3 depicts an exemplary view of the feature-specific reconstruction errors for a normal entity and an abnormal entity, in accordance with some embodiments.

FIG. 3 depicts an exemplary view of the feature-specific reconstruction errors for a normal entity and an abnormal entity, in accordance with some embodiments. For a normal entity 302 (e.g., a non-fraudulent merchant), the feature-specific reconstruction errors outputted by the machine-learning-based abnormality detector are depicted in the left graph. For an abnormal entity 304 (e.g., a fraudulent merchant), the feature-specific reconstruction errors outputted by the machine-learning-based abnormality detector are depicted in the right graph. In the depicted example, the reconstruction errors for different types of features (e.g., credit score, transaction size) are scaled differently based on the known variance associated with each feature.

As shown in FIG. 3, the feature-specific reconstruction errors for the fraudulent merchant 304 are generally larger than the corresponding feature-specific reconstruction errors for the non-fraudulent merchant 302. As a result, the total reconstruction error (e.g., the MSE of the feature-specific reconstruction errors) for the fraudulent merchant 304 is larger than the total reconstruction error for the non-fraudulent merchant 302. Importantly, the feature-specific reconstruction errors provide insight into exactly which features have contributed to the higher total reconstruction error.

Figure 4:
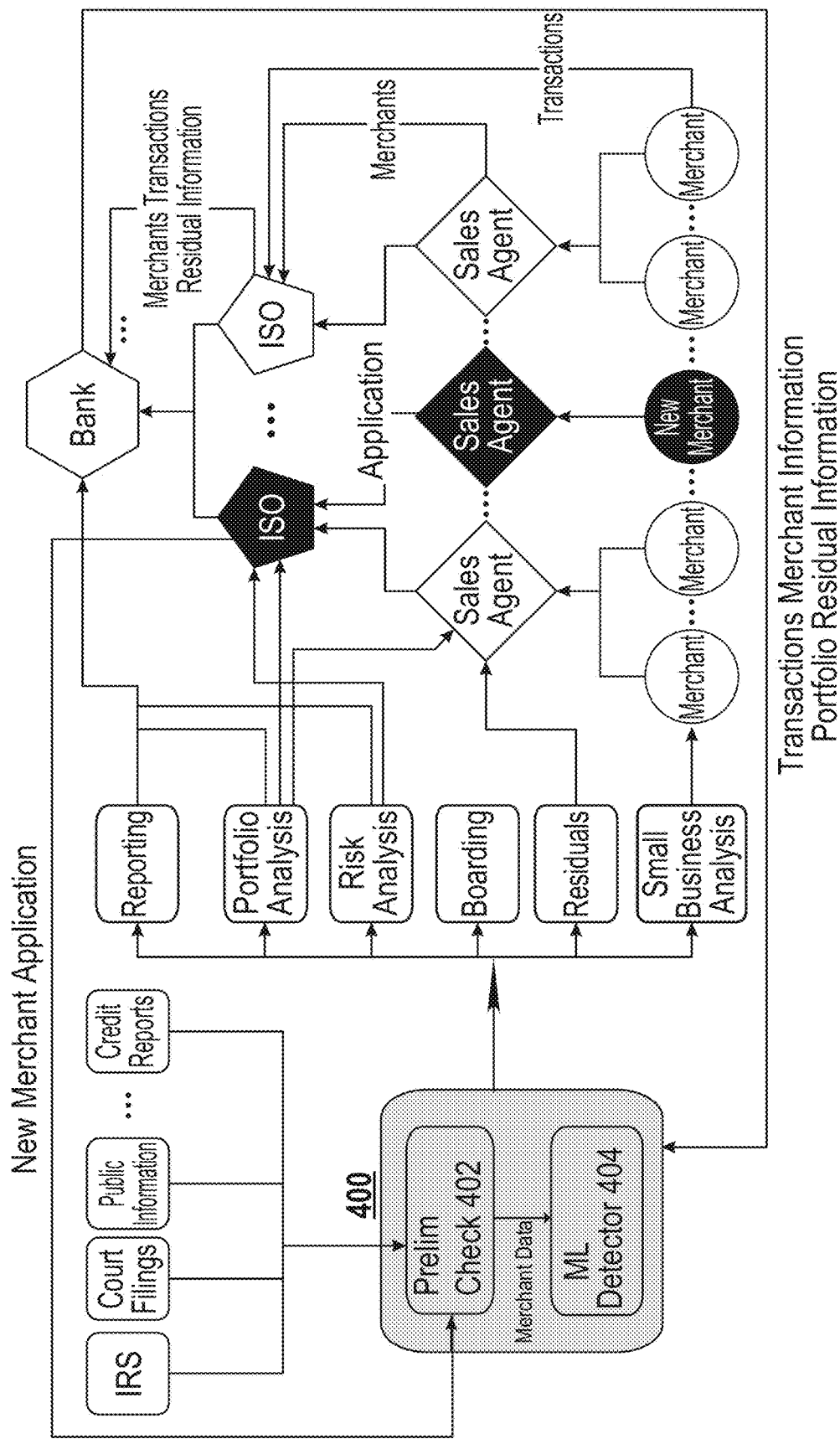
FIG. 4 depicts how an exemplary platform for detecting abnormal entities and activities can fit into a bank-Independent Sales Organization ("ISO") model, according to some embodiments of the invention.

FIG. 4 illustrates how an exemplary platform 400 for detecting abnormal entities and activities can fit into a bank-Independent Sales Organization ("ISO") model, according to some embodiments of the invention. The platform 400 services a hierarchy of customers, including banks, ISOs, sales agents, and merchants. In the hierarchy of the merchant processing industry, each bank can have multiple ISOs, each ISO can have multiple Sales Agents (and even sub ISOs), each Sales Agent can bring in multiple merchants, and every merchant can have multiple transactions.

The platform 400 can provide a tailored set of services to different customers in the hierarchy. The services include reporting, portfolio analysis, risk analysis, boarding, residuals, and small business analysis. In some embodiments, the platform can provide any combination of the services to any customer in a streamlined and end-to-end manner. In the depicted example, the platform 400 provides services of reporting, portfolio analysis, and risk analysis to the bank, while providing services of small business analysis to merchants. As another example, an individual who is only interested in understanding and monitoring the risks associated with certain merchants can purchase only the risk analysis service and the reporting service. For such an individual, the platform can allow the individual to query the merchants and transactions, provide risk information, and generate standardized reports accordingly. The platform 400 can render the services via one or more web portals, one or more software applications, one or more functions, one or more APIs, or any combination thereof.

The platform 400 includes a preliminary check component 402 and a machine-learning-based detector component 404. The preliminary check component 402 can perform the preliminary check 106 (FIG. 1). The detector component 404 can be the machine-learning-based anomaly detector 114 (FIG. 1) or the anomaly detector 200 (FIG. 2A). As depicted, the detector component 404 can be trained and retrained using transaction information, merchant information, and portfolio residual information obtained from the bank, which in turns obtains the data from ISOs, sales agents, and merchants in the hierarchy.

FIG. 4 also illustrates an exemplary merchant onboarding and vetting process. As shown, a new merchant can provide application information to an ISO via a sales agent. The ISO can provide the new merchant application to the platform 400. The platform 400 can perform a preliminary check using data from the new merchant application (i.e., the input entity-specific data 102 in FIG. 1) and the data from other data sources such as IRS, court filings, etc. (i.e., the derived entity-specific data 104A-N in FIG. 1) using the preliminary check component 402. Further, the preliminary check component 402 passes certain merchant data (i.e., the selected entity-specific data 112) to the detector 404 for further analysis, for example, to obtain feature-specific reconstruction errors. The outputs from the preliminary check 402 and the detector 404 are used by the platform to provide a plurality of services, as shown in FIG. 4.

The platform provides analysis and risk management all the way up the bank level. Specifically, the platform provides analysis at every level to not only determine where the largest amount of risk is coming from but to provide vital statistics about how a particular part of a portfolio (including the associated entities and the associated transactions) is performing. The platform also provides custom "views" of the data which are some filtered set of data with any parameters. For example, a bank customer can have a view that only looks at merchants of a particular ISO that have opened within the past 60 days and create a saved view can be returned to. The bank customer can also have a High/Medium/Low risk views which simply sort the merchants from a particular area into their respective categories based on the risk scores. In some embodiments, the platform provides reporting functionalities corresponding to any level, any entity, any transaction, and any time period. For example, the platform can allow a user to specify parameters for a report (e.g., by providing filters corresponding to different time periods, different entities, different risk scores, different portfolios, by allowing the user to specify display settings) and automatically generate a report based on the user-specified parameters. The platform can also provide standardized UI elements for reporting the various metrics. In some embodiments, reports of a particular format and of a particular organization can be automatically generated periodically or upon occurrence of certain events, based on user settings. For example, the platform can automatically generate a report in a standardized format every month and automatically transmit the report to a user group.

Figure 5A:
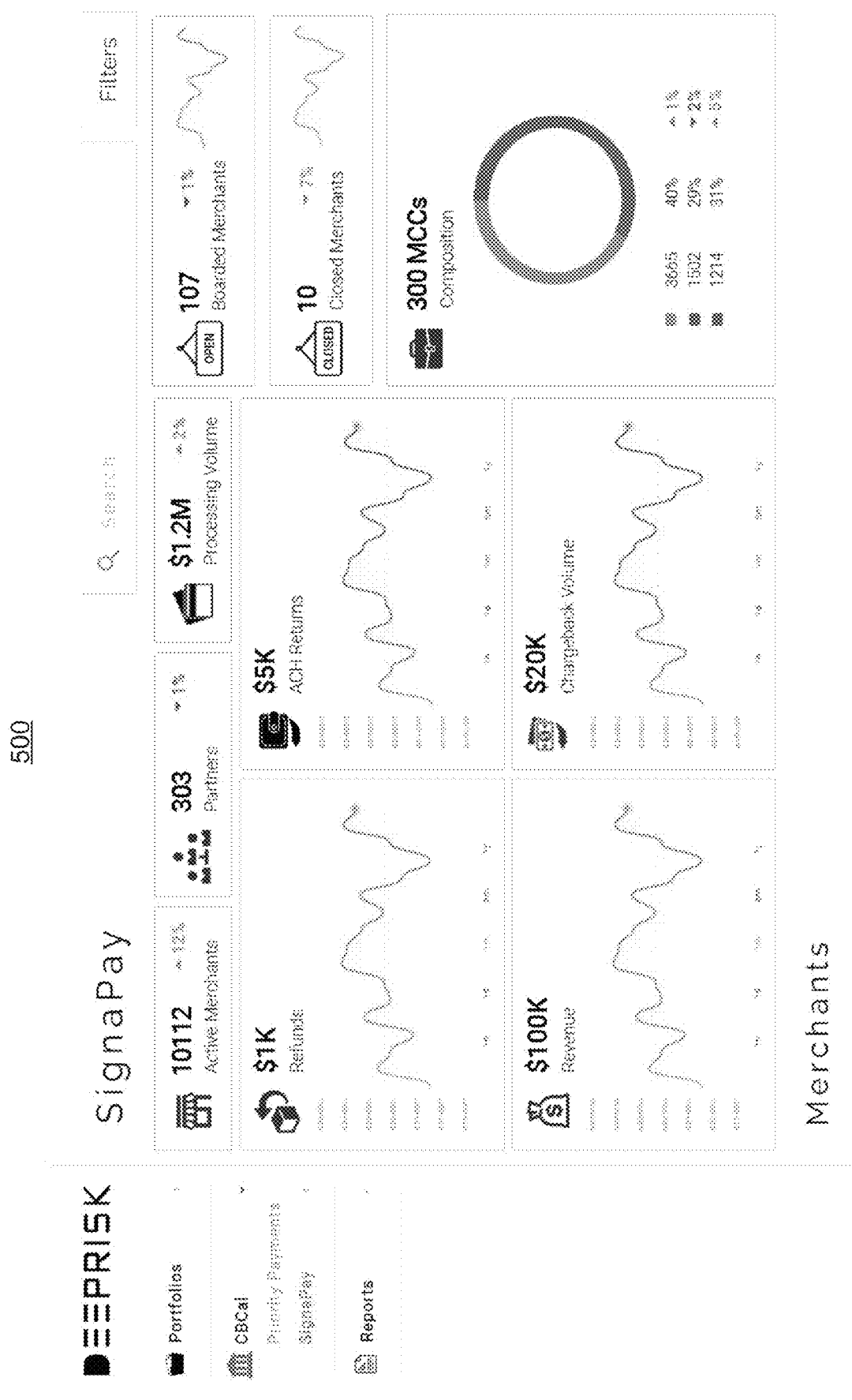
FIG. 5A depicts an exemplary summary reporting user interface, in accordance with some embodiments.

FIG. 5A depicts an exemplary summary reporting user interface 500, in accordance with some embodiments. The user interface 500 provides a summary view at a particular level. This view is generally for the owner of a portfolio to determine how their businesses are performing and to allow them to quickly find the segments of that portfolio are risky. At every level of the hierarchy, the platform provides a listing of all merchants, sales agents, and ISOs, underneath that particular portion of the portfolio. In the depicted example, "CBCal" is the parent bank of "SignaPay" and "Priority Payments," and the user interface 500 displays the SignaPay portion of the bank's portfolio. The platform allows the user to delve into a wide range of depth. A Bank CEO can view the user interface 500 on the home screen, but he/she could go into a specific ISO, then Agent, then Merchant, then Time period, and finally into a single Transaction. Then, he/she could backtrack into any previous level and explore the options at that level. The summary view can change at different levels. For example, at the merchant level, the user interface can provide information on how the business is performing in comparison to its competitors.

Figure 5B:
FIG. 5B depicts an exemplary merchant-specific reporting user interface 502, in accordance with some embodiments.

FIG. 5B depicts an exemplary merchant-specific reporting user interface 502, in accordance with some embodiments. The user interface 502 provides a visual display 504 of the total reconstruction error associated with the merchant over time. The user interface also provides a list of high risk areas 508. In some embodiments, the high risk areas represent the features associated with the highest feature-specific reconstruction errors. The user interface can further provide a risk score for a particular risk area, which can be calculated based on the associated reconstruction error and one or more thresholds (either default or user-specified). In some embodiments, the high risk areas represent the issues identified from the preliminary check. The user interface can further provide a summary of issues 506. In some embodiments, the summary of issues includes natural-language descriptions of the high risk areas. As shown in the abnormal merchant in FIG. 3, the most anomalous features can be determined and the platform can provide information indicative of the direction in which the feature should move to be more normal (toward the centerline representing a reconstruction error of 0).

In some embodiments, the platform further provides a ranking of merchants within a portfolio by their associated risks (e.g., total reconstruction errors). This way, a risk analyst can quickly drill down to review what the biggest issues are with the high-risk merchant and conduct follow-up research. A risk analyst would also be able to perform a set of actions with that merchant to be able to try to prevent other issues from occurring again. In some embodiments, the actions include: ignore (e.g., removing the merchant from the queue of risky merchants), hold (e.g., putting all transactions for a merchant on reserve to prevent the fraudulent transaction and stop further actions), auto contact (e.g., contacting the merchant for more information about what happened with a transaction to get more context), close (e.g., closing the merchant account). In some embodiments, the platform automatically provides a set of recommended actions based on the merchant's reconstruction error and predefined thresholds. For example, if the merchant's total reconstruction error is above a predefined threshold, the platform can automatically recommend closing the merchant account. As another example, if the merchant's total reconstruction error falls within a predefined range, the platform can automatically recommend the holding action. In some embodiments, the platform provides recommended actions on a merchant based on one or more of the highest feature-specific reconstruction errors associated with the merchant.

FIG. 6 illustrates process 600, according to various examples. Process 600 is performed, for example, using one or more electronic devices implementing a software platform. In some examples, process 600 is performed using a client-server system, and the blocks of process 600 are divided up in any manner between the server and a client device. In other examples, the blocks of process 600 are divided up between the server and multiple client devices. Thus, while portions of process 600 are described herein as being performed by particular devices of a client-server system, it will be appreciated that process 600 is not so limited. In other examples, process 600 is performed using only a client device (e.g., user device 100) or only multiple client devices. In process 600, some blocks are, optionally, combined, the order of some blocks is, optionally, changed, and some blocks are, optionally, omitted. In some examples, additional steps may be performed in combination with the process 600. Accordingly, the operations as illustrated (and described in greater detail below) are exemplary by nature and, as such, should not be viewed as limiting.

At block 602, the system receives a set of input data, wherein the set of input data is associated with an entity. At block 604, the system automatically obtains, based on the received set of input data, a set of derived data, wherein the set of derived data is associated with the entity. At block 606, the system obtains, based on the set of derived data, a plurality of feature values corresponding to a plurality of features. At block 608, the system provides the plurality of feature values to an autoencoder-decoder to obtain a plurality of feature-specific reconstruction errors. At block 610, the system selects, based on the plurality of feature-specific reconstruction errors, one or more features from the plurality of features. At block 612, the system outputs the selected one or more features and one or more textual descriptions associated with the selected one or more features.

Figure 7:
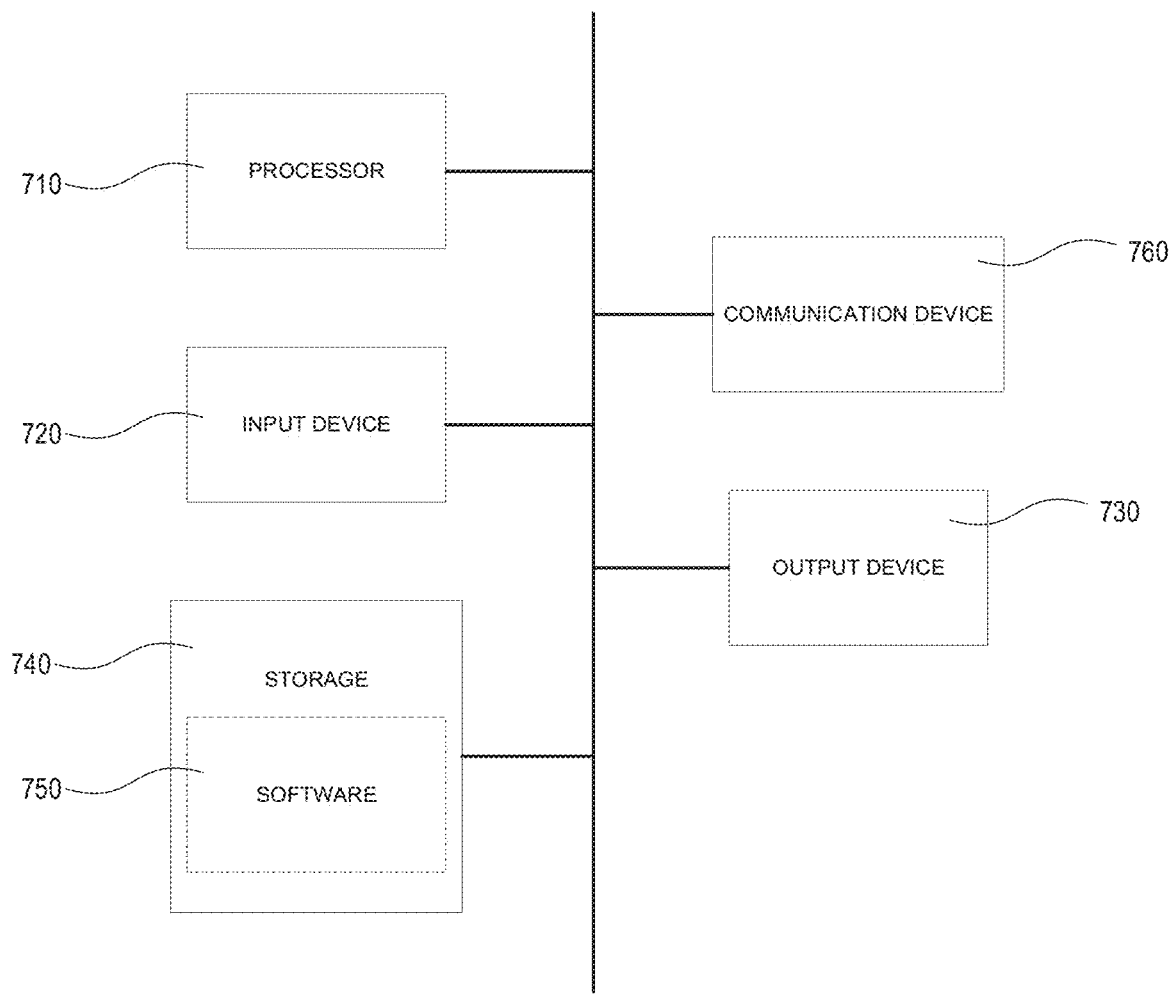
FIG. 7 depicts an example of a computing device, in accordance with some embodiments.

The operations described above with reference to FIG. 6 are optionally implemented by components depicted in FIG. 7. It would be clear to a person having ordinary skill in the art how other processes are implemented based on the components depicted in FIGS. 1-5 and 7.

FIG. 7 illustrates an example of a computing device in accordance with one embodiment. Device 700 can be a host computer connected to a network. Device 700 can be a client computer or a server. As shown in FIG. 7, device 700 can be any suitable type of microprocessor-based device, such as a personal computer, workstation, server or handheld computing device (portable electronic device) such as a phone or tablet. The device can include, for example, one or more of processor 710, input device 720, output device 730, storage 740, and communication device 760. Input device 720 and output device 730 can generally correspond to those described above, and can either be connectable or integrated with the computer.

Input device 720 can be any suitable device that provides input, such as a touch screen, keyboard or keypad, mouse, or voice-recognition device. Output device 730 can be any suitable device that provides output, such as a touch screen, haptics device, or speaker.

Storage 740 can be any suitable device that provides storage, such as an electrical, magnetic or optical memory including a RAM, cache, hard drive, or removable storage disk. Communication device 760 can include any suitable device capable of transmitting and receiving signals over a network, such as a network interface chip or device. The components of the computer can be connected in any suitable manner, such as via a physical bus or wirelessly.

Software 750, which can be stored in storage 740 and executed by processor 710, can include, for example, the programming that embodies the functionality of the present disclosure (e.g., as embodied in the devices as described above).

Software 750 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 700 can implement any operating system suitable for operating on the network. Software 750 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. A computer-enabled method for detecting an abnormal entity, the method comprising:
   receiving a set of input data, wherein the set of input data is associated with a plurality of transactions associated with an entity;
   automatically obtaining, based on the received set of input data, a set of derived data, wherein the set of derived data is associated with the entity;
   obtaining, based on the set of derived data, a plurality of feature values corresponding to a plurality of features associated with the entity, wherein each feature of the plurality of features is associated with the entity;
   providing the plurality of feature values to a trained autoencoder-decoder to obtain a plurality of feature-specific reconstruction errors, wherein the autoencoder-decoder is configured to be retrained using at least in part the set of derived data and wherein each feature-specific reconstruction error of the plurality of feature-specific reconstruction errors corresponds to a feature of the plurality of features associated with the entity;
   scaling the plurality of feature-specific reconstruction errors based on variances associated with the plurality of features;
   determining whether the entity is abnormal based on the plurality of feature-specific reconstruction errors;
   selecting, from the plurality of feature-specific reconstruction errors, one or more feature-specific reconstruction errors;
   identifying one or more features of the entity corresponding to the selected one or more feature-specific reconstruction errors;
   outputting the identified one or more features of the entity as contributors of an anomaly status of the entity one or more textual descriptions associated with the identified one or more features, and a graphical representation of a risk value over time based on the plurality of feature-specific reconstruction errors.

2. The method according to claim 1, wherein the entity is a merchant.

3. The method according to claim 2, further comprising: providing a recommended action on the merchant based on the plurality of feature-specific reconstruction errors.

4. The method according to claim 3, wherein the recommended action comprises closing an account associated with the entity.

5. The method according to claim 1, wherein the set of input data comprises data related to a merchant application.

6. The method according to claim 1, wherein the set of derived data is obtained from a plurality of data sources.

7. The method according to claim 1, further comprising: before providing the plurality of feature values to the trained autoencoder-decoder, performing a check on the set of derived data based on a plurality of rule-sets.

8. The method according to claim 1, wherein the plurality of features comprises: how long the entity has been in business, a number of businesses the entity has, a transaction size of the entity, a transaction volume of the entity, location of the entity, a credit score, transaction types, a formation type, credit histories, or any combination thereof.

9. The method according to claim 1, wherein a feature of the plurality of features is related to a business owned by the entity, and wherein the feature is weighted based on a percentage of ownership of the business by the entity.

10. The method according to claim 1, wherein the plurality of features comprises: a transaction amount, a refund amount, a type of card, entry mode, authorization source, cardholder authorization method, a terminal type, a purpose of a transaction, usage history of a card, time of a transaction, a number of attempts associated with a transaction, information related to a cardholder, information related to a card, or any combination thereof.

11. The method according to claim 1, wherein the trained autoencoder-decoder comprises:
    a first recurrent neural network configured to compress the plurality of feature values to obtain a set of compressed values; and
    a second recurrent neural network configured to decompress the set of compressed values to obtain a plurality of reconstructed feature values.

12. The method according to claim 11, wherein the plurality of feature-specific reconstruction errors comprises a plurality of differences between the plurality of reconstructed feature values and the plurality of feature values.

13. The method according to claim 11, further comprising calculating a total reconstruction error of the entity based on the plurality of feature-specific reconstruction errors.

14. The method according to claim 1, wherein the autoencoder-decoder is trained using an initial set of training data, wherein the initial set of training data comprises data related to normal entities and data related to abnormal entities.

15. The method according to claim 14, wherein the normal entities are non-fraudulent merchants, and the abnormal entities are fraudulent merchants.

16. The method according to claim 1, wherein the entity is a first entity, the method further comprising: outputting one or more features associated with a second entity and one or more descriptions associated with the one or more features associated with the second entity.

17. An electronic device, comprising: one or more processors; a memory; and one or more programs, wherein the one or more programs are stored in the memory and configured to be executed by the one or more processors, the one or more programs including instructions for:
    receiving a set of input data, wherein the set of input data is associated with a plurality of transactions associated with an entity;
    automatically obtaining, based on the received set of input data, a set of derived data, wherein the set of derived data is associated with the entity;
    obtaining, based on the set of derived data, a plurality of feature values corresponding to a plurality of features associated with the entity, wherein each feature of the plurality of features is associated with the entity;
    providing the plurality of feature values to a trained autoencoder-decoder to obtain a plurality of feature-specific reconstruction errors, wherein the autoencoder-decoder is configured to be retrained using at least in part the set of derived data and wherein each feature-specific reconstruction error of the plurality of feature-specific reconstruction errors corresponds to a feature of the plurality of features associated with the entity;

scaling the plurality of feature-specific reconstruction errors based on variances associated with the plurality of features;

determining whether the entity is abnormal based on the plurality of feature-specific reconstruction errors;

selecting, from the plurality of feature-specific reconstruction errors, one or more feature-specific reconstruction errors;

identifying one or more features of the entity corresponding to the selected one or more feature-specific reconstruction errors;

outputting the identified one or more features of the entity as contributors of an anomaly status of the entity, one or more textual descriptions associated with the identified one or more features, and a graphical representation of a risk value over time based on the plurality of feature-specific reconstruction errors.

18. A non-transitory computer-readable storage medium storing one or more programs, the one or more programs comprising instructions, which when executed by one or more processors of an electronic device, cause the electronic device to:

receiving a set of input data, wherein the set of input data is associated with a plurality of transactions associated with an entity;

automatically obtaining, based on the received set of input data, a set of derived data, wherein the set of derived data is associated with the entity;

obtaining, based on the set of derived data, a plurality of feature values corresponding to a plurality of features associated with the entity, wherein each feature of the plurality of features is associated with the entity;

providing the plurality of feature values to a trained autoencoder-decoder to obtain a plurality of feature-specific reconstruction errors, wherein the autoencoder-decoder is configured to be retrained using at least in part the set of derived data and wherein each feature-specific reconstruction error of the plurality of feature-specific reconstruction errors corresponds to a feature of the plurality of features associated with the entity;

scaling the plurality of feature-specific reconstruction errors based on variances associated with the plurality of features;

determining whether the entity is abnormal based on the plurality of feature-specific reconstruction errors;

selecting, from the plurality of feature-specific reconstruction errors, one or more feature-specific reconstruction errors;

identifying one or more features corresponding to the selected one or more feature-specific reconstruction errors;

outputting the identified one or more features of the entity as contributors of an anomaly status of the entity, one or more textual descriptions associated with the identified one or more features, and a graphical representation of a risk value over time based on the plurality of feature-specific reconstruction errors.

19. The method of claim 1, wherein the trained autoencoder-decoder is a recurrent neural network ("RNN") variational autoencoder-decoder.

20. The method of claim 1, wherein the trained autoencoder-decoder generates a vector in an embedded space based on the plurality of feature values, the method further comprising: identifying another entity similar to the entity based on the vector.

21. The method of claim 1, wherein the one or more textual descriptions associated with the selected one or more features comprise natural-language descriptions.

22. The method according to claim 1, wherein obtaining the set of derived data comprises: transforming a portion of the set of input data into a sin/cosine pair format.

* * * * *